H. MILLER.
SHEET METAL CAN.
No. 40,661. Patented Nov. 17, 1863.
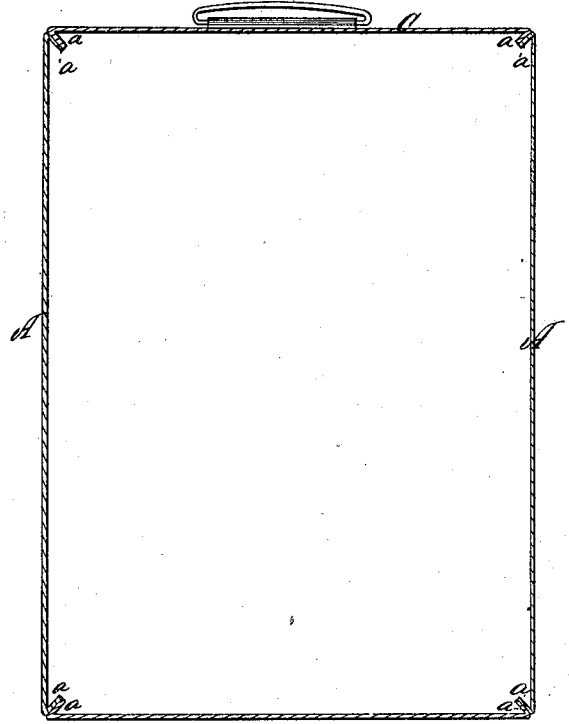
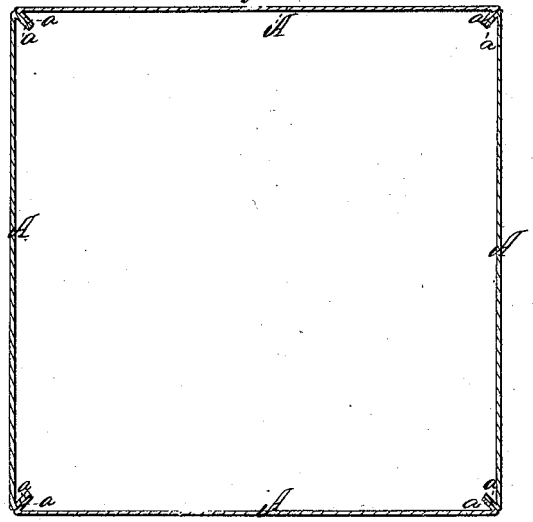
Witnesses: Geo. W. Reed, M. M. Livingston
Inventor: Herman Miller

UNITED STATES PATENT OFFICE.

HERMAN MILLER, OF NEW YORK, N. Y., ASSIGNOR TO CHAS. T. RAYNOLDS, FREDK. W. DEVOE, AND CHARLES PRATT, OF SAME PLACE.

IMPROVEMENT IN SHEET-METAL CANS.

Specification forming part of Letters Patent No. 40,661, dated November 17, 1863.

*To all whom it may concern:*

Be it known that I, HERMAN MILLER, of the city, county, and State of New York, have invented a new and useful Improvement in Cans and other Vessels Made of Sheet Metal; and I do hereby declare that the following is a full, clear, and exact description of the same, reference being had to the accompanying drawings, forming part of this specification, in which—

Figure 1 is a vertical section of a tin can constructed according to my invention. Fig. 2 is a horizontal section of the same. Fig. 3 is a transverse section of one of the joints in position for soldering.

Similar letters of reference indicate corresponding parts in the several figures.

This invention consists in making the seams or joints in cans or other vessels of tin-plate or other sheet metal by simply turning in singly the margins of the plates at a suitable angle and soldering together the outer faces of the said turned-in margins, which are thus made to form a double rib projecting directly inward from the interior of the vessel, and give the vessel much greater stiffness than any other kind of joint.

A A are the side plates, B the bottom, and C the top, of the can. $a\,a$ are the marginal portions, which are turned in singly to form the joints. The can being square, the portions $a\,a$ are all turned in at angles of forty-five degrees to their respective plates, that the face of each may match the face of the one which comes next to it, as shown in the drawings. If the can is of any other angular form, the marginal portions $a\,a$ are turned in in the same manner at such an angle as will make them match in the same way, such angle being always half the angle formed by the two plates; or, in making the joint or joints up the side or sides of a circular can, the said marginal portions are radial to the circle of the body of the can. I generally make the said turned-in portions $a\,a$ about a quarter of an inch wide; but the width may be varied to suit circumstances.

To solder the joint, I place the two turned-in portions $a\,a$ together in a vice or clamp having its jaws of suitable form to clamp them together with the outer angle of the seam upward. The solder is then applied along the angle of the joint, followed by the hot soldering-iron, and the solder caused to run in between the two turned-in portions $a\,a$ of the plates, and so unite them securely, forming the double rib projecting directly inward from the interior of the vessel, such rib giving greater strength and stiffness to the vessel than any other kind of joint, and making as close and secure a joint as when the joint is made with a lap.

What I claim as my invention, and desire to secure by Letters Patent, is—

Making the seams or joints of sheet-metal vessels by turning in the marginal portions singly at proper angles and soldering the faces of the said portions together to form a double inwardly-projecting rib, substantially as herein described.

HERMAN MILLER.

Witnesses:
GEO. W. REED,
M. M. LIVINGSTON.